Nov. 18, 1952 — C. H. DAVENPORT — 2,618,546
FERTILIZER MANUFACTURE
Filed April 11, 1949
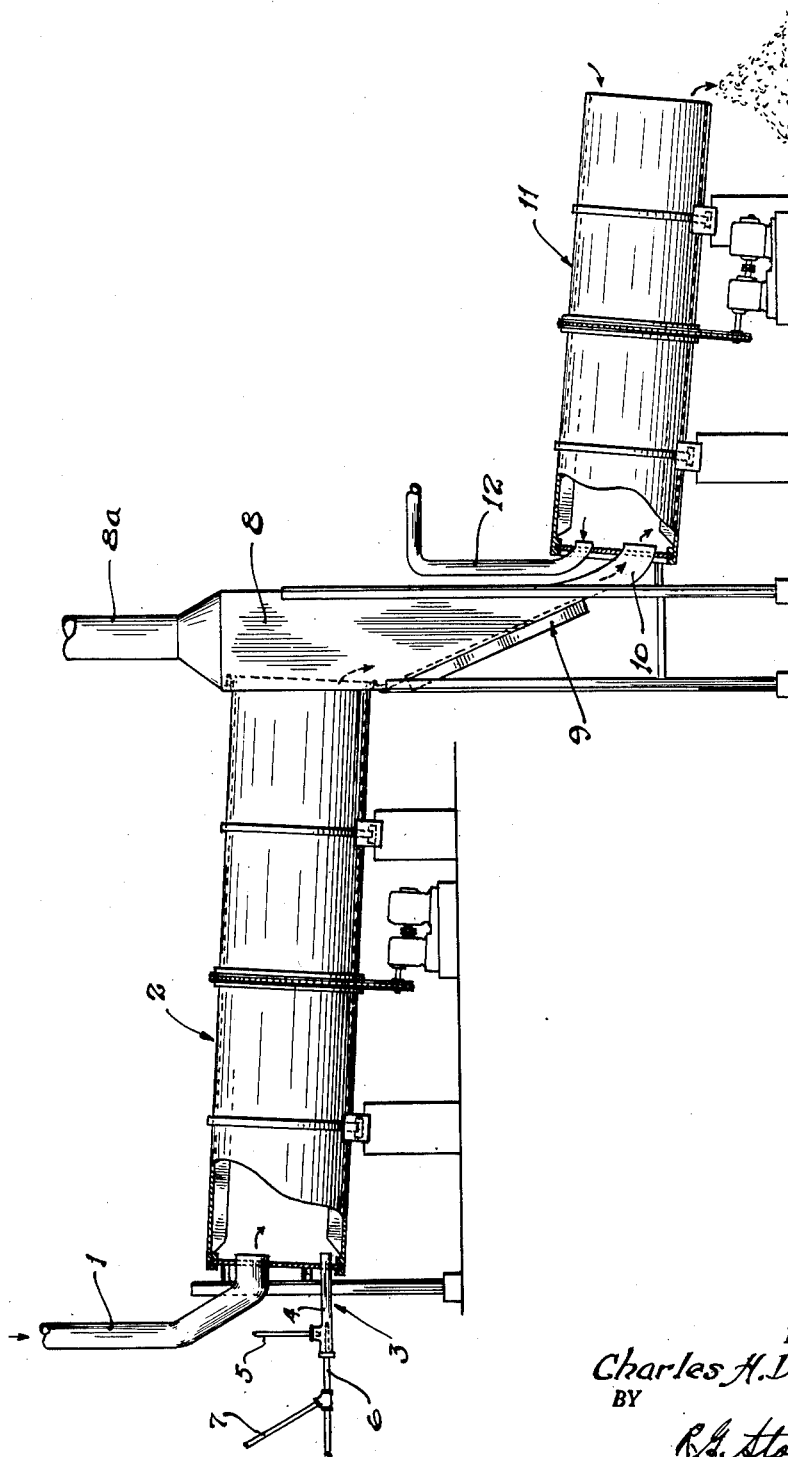
INVENTOR.
Charles H. Davenport
BY
R. G. Story
ATTORNEY Patented Nov. 18, 1952

2,618,546

UNITED STATES PATENT OFFICE 2,618,546

FERTILIZER MANUFACTURE

Charles H. Davenport, El Dorado, Ark., assignor to Swift & Company, Chicago, Ill., a corporation of Illinois Application April 11, 1949, Serial No. 86,681

4 Claims. (Cl. 71—30)

The present invention relates to the manufacture of mixed fertilizers and more particularly to a process for preparing a mixed fertilizer containing water-insoluble nitrogen.

It has long been realized that nitrogen compounds are essential for normal plant metabolism. Therefore, in preparing fertilizer mixtures it has been the practice to add one or more of the compounds of nitrogen thereto. However, these nitrogen compounds have normally been water soluble and, consequently, leached out rapidly in the soil following fertilizer application. Moreover, because of their water-soluble nature, they are often initially furnished to the growing plants in quantities in excess of that desirable for plant growth.

Attempts have been made to remedy this situation by adding to a fertilizer mixture, materials containing nitrogen in water-insoluble or only very slightly soluble form. As examples of such materials there may be listed humus, cottonseed hulls, peanut hulls, dry blood, etc., which provide small amounts of nitrogen and act as soil conditioners. Such materials, however, are expensive and may be used only in premium products; and, furthermore, their nitrogen content is represented by compounds, which are only broken down with great difficulty to supply nitrogen in a form which is available for plant metabolism. Thus, there is often a question as to whether there is provided any appreciable benefit as far as a prolonged plant food is concerned.

In recent years, it has been found that a nitrogen-containing resinous material comprising the reaction product of urea and formaldehyde, and particularly such a product condensed in the presence of free ammonia, provides an excellent source of nitrogen of prolonged availability for plant growth. The present invention deals with a process for incorporating this nitrogen-containing resinous material in a fertilizer mixture.

It is an object of the present invention to provide an economical and efficient method for incorporating relatively large amounts of water-insoluble nitrogen in a mixed fertilizer.

A further object of the present invention is to provide a process for incorporating water-insoluble nitrogen in a mixed fertilizer under conditions which greatly favor the reaction of the materials which combine to form the water-insoluble nitrogen compound.

A still further object of the present invention is to provide a process for preparing a fertilizer mixture containing water-insoluble nitrogen which shows highly desirable physical properties, such as excellent granulation and minimum segregation.

Yet another object of the present invention is to provide a process for preparing a fertilizer mixture containing water-insoluble nitrogen by means of which excess water is automatically removed from the mixture resulting in a drier product.

Another and further object of the present invention is to provide a process for the preparation of a mixed fertilizer containing water-insoluble nitrogen, which at the same time renders other ingredients of the fertilizer slower dissolving.

Yet another object of the present invention is to provide a process for preparing a mixed fertilizer containing water-insoluble nitrogen in which the separate ingredients will be more homogeneously mixed than has been the case with that prepared by earlier processes.

Still another object of the present invention is to provide a process for preparing a fertilizer mixture containing water-insoluble nitrogen mixtures which will be less subject to caking than such fertilizers heretofore prepared.

Other and further objects of the present invention will be apparent from the following detailed description taken in conjunction with the drawing, which is a diagrammatic view of one form of apparatus which has been found to be highly effective in carrying out the process.

It has been found, in accordance with the present invention, that an excellent method for preparing a fertilizer mixture containing water-insoluble nitrogen may be carried out by causing a urea-formaldehyde condensation product to be formed in situ in the mixture. For this purpose, a urea is added to the mixture along with the solid ingredients of the mix and formaldehyde along with the other liquid ingredients thereof added in liquid form. While, as indicated, formaldehyde is to be added along with the liquid ingredients of the mixture, it is to be added from a separate source in order that the amount added will not in any way affect the solubility characteristics of any ingredients in the liquids used.

The term "urea" is intended to include not only urea itself but also includes the possible use of thiourea and derivatives of urea and thiourea, such as the monoalkyl and monoacyl ureas and thioureas, as well as the urethanes and thiourethanes. The term also includes guanidine and such derivatives thereof as the alkylated and acylated guanidines. Typical examples of compounds coming within the scope of the above term are urea, thiourea, methyl and ethyl urea, methyl and ethyl thiourea, acetyl urea, guanidine, urethane, biuret, and the like.

As a substitute for formaldehyde, the compound furfural is contemplated, although formaldehyde is generally to be preferred from a cost and ease-of-reaction standpoint.

The solid ingredients of the fertilizer may be any of the usual fertilizer solids, and their nature and amount is not critical in connection with the present invention. As examples of such solid ingredients may be listed superphosphate, triple superphosphate, muriate of potash, dolomite, or the like.

The liquid ingredients of the fertilizer should include a liquid or liquids high in free ammonia and a solution of a strong mineral acid. Examples of ammonia-containing liquids which may be used are B-liquor (an approximately 30% solution of ammonia), Barrett's solution (a mixture of ammonium nitrate, water, and free ammonia), and liquid anhydrous ammonia. As the acid component, sulfuric acid is preferred; but it is to be understood that other mineral acids which will combine with ammonia in a strongly exothermic reaction, may be employed. The relative proportions of ammonia-containing liquid to acid should be such that there will be present after reaction between the two an excess of free ammonia, this excess being available for interaction with the acidic constituents of the fertilizer solids in the mixer (for example, superphosphate).

In carrying out the process, enough urea and formaldehyde should be employed so that the urea-formaldehyde molar ratio will be between 1:1 and 5:1, with a range between 1:1 and 2:1 being preferred. It has been found highly satisfactory to add the formaldehyde in the form of its widely-marketed, approximately 37% aqueous solution.

In carrying out the present invention in an apparatus such as that illustrated by the drawings, fertilizer solids and urea may be continuously fed by a conduit 1 through the seal plate of a rotary mixer 2 of conventional design. The individual fertilizer solids and urea may be supplied to the conduit from individual hoppers, the feeds of which are regulated by conventional means; or they may first be delivered together with the urea to a common mixing hopper from which they are continuously supplied to conduit 1 at the desired rate. It is also possible, of course, to add the fertilizer solids and urea separately to the mixer so that they are not mixed until received therein, and such a procedure is contemplated as being within the scope of the claims. However, it is preferred that mixing occur prior to admission into the mixer 2.

The desired proportions of liquid ingredients of the mixture are continuously injected into the urea-containing fertilizer solids through an injector 3 emptying into mixer 2 at a point adjacent the outlet of conduit 1. The injector 3 may include a manifold portion 4 supplied with a regulated amount of sulfuric or other mineral acid from a suitable source through a conduit 5. Ammonia-containing liquids may be supplied to the manifold portion 4 through a conduit 6 concentrically arranged with respect to the manifold section 4. As indicated earlier, formaldehyde is supplied to conduit 6 from a source separate from the ammonia-containing liquids and may empty into conduit 6 through a conduit 7 which joins the first-mentioned conduit at a point removed from the injecting device. The liquid ingredients of the mix may be separately metered into the conduit 6 from any suitable source of supply.

When ammonia and sulfuric acid are contacted, they immediately react with the evolution of considerable amounts of steam because of the highly exothermic nature of the reaction. Thus, the fertilizer solids containing urea are immediately contacted as they enter mixer 2 by the entering highly-heated steam and liquids containing formaldehyde, ammonium sulphate, and ammonium acid sulphate, as well as free ammonia and acid which has escaped neutralization in the jet. The heat of this liquid-vapor stream impinging on the solids cause a rapid reaction between the urea and formaldehyde, producing an insoluble, resinous nitrogen-containing reaction product. The urea-formaldehyde condensation is itself exothermic and further promotes the reaction.

It has been found that the solids tumbling in the moist steam atmosphere undergo a marked tendency toward a cementing action, and this tumbling, accompanied by surface wetting of the individual particles by steam, produces a marked uniform granulation of the product. Moreover, the resinous reaction product, being formed in situ, tends to coat at least partially the particles of water-soluble ingredients of the fertilizer mixture, which renders even these ingredients of the fertilizer available for longer periods of time than would otherwise be the case as they are not then so readily leached in the soil.

The mixed fertilizer so formed is tumbled in the steam atmosphere in its travel through the mixer 2, which may be provided with suitable flights or ribs, and is continuously discharged into a receiver 8 which is provided with a large conduit 8a at its upper end for the continual venting of steam therefrom. In this manner it is seen that excess water is automatically removed, resulting in a considerably drier product. By the same token, it is possible, because of the steam-venting feature, to employ larger percentages of liquid ingredients than would otherwise be the case and still obtain a relatively dry final product which exhibits little tendency toward caking.

From the receiver 8 the solids are continuously fed, aided by a vibrating device 9, if necessary, through an outlet 10 into a cooler 11, which may also be of the rotating type and generally similar in its structure to that of the mixer 2. Cooling of the product may conveniently be aided by continuously drawing air through the mixture in a direction countercurrent with respect to flow of solids therethrough by the employment of a suction duct 12. Solids are continuously withdrawn from the end of the mixer remote from the outlet 10 and passed to storage by any suitable conveying means.

As a specific example of the present process, carried out as outlined above, there is set forth as follows a listing of the ingredients employed and the proportions of the same:

| Ingredients: | Per cent employed |
|---|---|
| Formaldehyde (37% aqueous solution) | 7.6 |
| B-liquor (30% aqueous ammonia) | 3.7 |
| Anhydrous ammonia | 1.8 |
| Sulfuric acid (60° Bé.) | 6.1 |
| Urea | 7.3 |
| Muriate of potash | 9.4 |
| Superphosphate | 47.5 |
| Dolomite | 15.3 |
| Minor elements | 1.0 |
| Color solution | 0.3 |
| Total | 100.0 |

The urea was of −10 mesh size and was mixed with the other solid ingredients which were −6 mesh. The liquids were sprayed from the injector device previously described.

Analysis at 3 days and 8 days showed the presence of 2.90% water-insoluble nitrogen, indicating completion of the reaction at least by 3 days and also providing a check on the predicted performance. Six separate runs gave identical results, indicating the reliability of the method and its practical value.

Screen analyses on all such prepared products showed that 80% to 85% of the same were in the desirable 6 to 40 mesh range, as to particle size. Screen analyses on similar products without the water-insoluble nitrogen showed only 25% to 33% in this desirable range with 65% to 70% being of an undesirable −40 mesh size. Hence, the granulation produced by following the instant process is clearly demonstrated.

Although the present invention has been described above in connection with a continuous process, it is to be understood that it is not absolutely essential that the process be carried out in this manner, although such a procedure is preferred. If desired, a batch process may be employed with the desired amounts of solids and urea being first deposited in a suitable mixing apparatus, the liquid ingredients and formaldehyde injected into the same, and with the product being mixed or tumbled for a time sufficient to produce the desired reaction and cementing action. The final product may then be dumped as a whole from the mixer.

Thus, it is seen that by the present invention there has been provided a process for the manufacture of a mixed fertilizer containing water-insoluble nitrogen in which the water-insoluble nitrogen is formed in situ and the product possesses a desirable granulated and dry condition.

Obviously, many modifications and variations of the invention as hereinbefore set forth may be made without departing from the spirit and scope thereof, and therefore only such limitations should be imposed as are indicated in the appended claims.

I claim:

1. A continuous process for the manufacture of a mixed fertilizer which comprises: continuously charging acid-reacting fertilizer solids containing urea into one end of an elongated mixing and tumbling zone; continuously injecting into said tumbling fertilizer solids in said zone adjacent the charging end thereof a mixture of highly heated steam, ammonium salt and free ammonia, comprising the reaction products from the neutralization of mineral acid with a nitrogen-containing solution having dissolved therein free ammonia in excess of the amount required to fully neutralize the mineral acid, and formaldehyde; continuously advancing said fertilizer solids through said mixing zone away from said charging end until the excess ammonia has reacted substantially completely with the acid-reacting constituents to produce insoluble, resinous, nitrogen-containing reaction products; then, after said reactions are complete and during the continued movement of the fertilizer solids towards the discharge end of said zone, continuously venting said steam from said mixing zone at a point adjacent the discharge end thereof; and finally continuously discharging a substantially uniform, granulated and relatively-dry product from said zone.

2. A process as in claim 1 wherein the mineral acid is sulfuric acid.

3. In a continuous process for the manufacture of a mixed fertilizer wherein continuously tumbling acid-reacting fertilizer solids containing urea are treated in an elongated mixing and tumbling zone with a mixture including free ammonia and formaldehyde, said mixture being injected into said solids adjacent the charging end of said zone, the steps which comprise: continuously advancing said fertilizer solids and urea through said zone in an atmosphere of highly heated steam away from the point of injection of said ammonia and formaldehyde-containing mixture until the free ammonia has reacted substantially completely with the acid-reacting constituents of said fertilizer solids and the formaldehyde has reacted substantially completely with the urea; and then, after said reactions are completed and during the continued movement of the fertilizer solids toward the discharge end of said zone, continuously venting said steam from said zone at a point adjacent the discharge end thereof to produce a uniform, granulated and relatively dry product.

4. A process as in claim 3 wherein the mineral acid is sulfuric acid.

CHARLES H. DAVENPORT.

REFERENCES CITED

The following references are of record in the file of this patent:

UNITED STATES PATENTS

| Number | Name | Date |
|---|---|---|
| 2,047,393 | Siems | July 14, 1936 |
| 2,096,742 | Hale | Oct. 26, 1937 |
| 2,255,027 | Keeman et al. | Sept. 2, 1941 |
| 2,415,705 | Rohner et al. | Feb. 11, 1947 |

FOREIGN PATENTS

| Number | Country | Date |
|---|---|---|
| 431,585 | Germany | July 12, 1926 |